(12) United States Patent
Weidmann et al.

(10) Patent No.: US 10,981,829 B2
(45) Date of Patent: Apr. 20, 2021

(54) BLOCK COPOLYMERS AS DISPERSANTS FOR ALKALI-ACTIVATED BINDERS

(71) Applicant: SIKA TECHNOLOGY AG, Baar (CH)

(72) Inventors: Jürg Weidmann, Winterthur (CH); Lukas Frunz, Dietlikon (CH); Jörg Zimmermann, Winterthur (CH); Patrick Juilland, Bern (CH)

(73) Assignee: SIKA TECHNOLOGY AG, Baar (CH)

( * ) Notice: Subject to any disclaimer, the term of this patent is extended or adjusted under 35 U.S.C. 154(b) by 3 days.

(21) Appl. No.: 15/763,081

(22) PCT Filed: Sep. 22, 2016

(86) PCT No.: PCT/EP2016/072551
§ 371 (c)(1),
(2) Date: Mar. 23, 2018

(87) PCT Pub. No.: WO2017/050902
PCT Pub. Date: Mar. 30, 2017

(65) Prior Publication Data
US 2018/0273428 A1   Sep. 27, 2018

(30) Foreign Application Priority Data

Sep. 24, 2015 (EP) .................................. 15186754

(51) Int. Cl.
| | | |
|---|---|---|
| *C04B 24/26* | (2006.01) | |
| *C04B 28/04* | (2006.01) | |
| *C08F 293/00* | (2006.01) | |
| *C04B 24/24* | (2006.01) | |
| *C04B 28/08* | (2006.01) | |
| *C04B 24/16* | (2006.01) | |
| *C04B 28/02* | (2006.01) | |
| *C04B 103/00* | (2006.01) | |
| *C04B 103/40* | (2006.01) | |

(52) U.S. Cl.
CPC ........ *C04B 24/2694* (2013.01); *C04B 24/165* (2013.01); *C04B 24/246* (2013.01); *C04B 24/267* (2013.01); *C04B 24/2647* (2013.01); *C04B 24/2658* (2013.01); *C04B 28/021* (2013.01); *C04B 28/04* (2013.01); *C04B 28/08* (2013.01); *C08F 293/005* (2013.01); *C04B 2103/0061* (2013.01); *C04B 2103/408* (2013.01); *C08F 2438/03* (2013.01); *Y02W 30/91* (2015.05)

(58) Field of Classification Search
CPC ... C04B 24/2694; C04B 28/04; C04B 24/246; C04B 24/267; C04B 28/08; C04B 24/2647; C04B 24/165; C04B 28/021; C08F 293/005
See application file for complete search history.

(56) References Cited

U.S. PATENT DOCUMENTS

| | | | | |
|---|---|---|---|---|
| 2007/0073022 A1* | 3/2007 | Yuasa | ................. | C04B 24/2647 526/317.1 |
| 2008/0196629 A1* | 8/2008 | Yamakawa | ............. | C04B 28/02 106/730 |
| 2013/0303663 A1* | 11/2013 | Agnely | ............... | C04B 24/2641 524/5 |
| 2014/0080943 A1 | 3/2014 | Marchon et al. | | |
| 2016/0075852 A1* | 3/2016 | Lai | ........................ | C08K 3/346 524/2 |

FOREIGN PATENT DOCUMENTS

| | | |
|---|---|---|
| CN | 104311761 A | 1/2015 |
| EP | 1 110 981 A2 | 6/2001 |
| EP | 1 138 697 A1 | 10/2001 |
| EP | 1 767 555 A2 | 3/2007 |
| FR | 2 969 156 A1 | 6/2012 |
| JP | 2012-036087 A | 2/2012 |
| JP | 2014-518189 A | 7/2014 |
| WO | 2011/015780 A1 | 2/2011 |
| WO | 2015/144886 A1 | 10/2015 |

OTHER PUBLICATIONS

Columbian Office Action.
Koltzenburg et al., "Polymere: Synthese, Synthese and Eigenschaften," Polymers: Synthesis, Synthesis and Properties, Springer Spektrum, pp. 246-258 & 386-393.
"Fundamentals of Controlled/Living Radical Polymerization," RSC Polymer Chemistry Series No. 4, Edited by Nicolay V Tsarevsky and Brent S Sumerlin, The Royal Society of Chemistry, 2013, pp. v-vii, ix-xiv, 112-129 & 205-210.
Dec. 15, 2016 International Search Report issued in International Patent Application No. PCT/EP2016/072551.
Mar. 27, 2018 International Preliminary Report on Patentability issued in International Patent Application No. PCT/EP2016/072551.
Feb. 14, 2020 Office Action issued in Indian Patent Application No. 201817014997.
Feb. 27, 2020 Office Action issued in Colombian Patent Application No. NC2018/0004240.

(Continued)

*Primary Examiner* — John E Uselding
(74) *Attorney, Agent, or Firm* — Oliff PLC

(57) ABSTRACT

A block copolymer for use as a dispersant for mineral binder compositions, containing an alkali activating agent. The block copolymer includes at least one first block A and at least one second block B, the first block A containing a monomeric unit M1 and the second block B containing a monomeric unit M2. A proportion of monomeric units M2, if any, in the first block A is less than 25 mol %, in particular less than or equal to 10 mol %, relative to all the monomeric units M1 in the first block A, and a proportion of monomeric units M1, if any, in the second block B is less than 25 mol %, in particular less than or equal to 10 mol %, relative to all the monomeric units M2 in the second block B.

17 Claims, No Drawings

(56) References Cited

OTHER PUBLICATIONS

Mar. 31, 2020 Office Action issued in Indonesian Patent Application No. P00201802710.
Feb. 18, 2020 Office Action issued in Brazilian Patent Application No. BR112018005567-0.
May 13, 2020 Office Action issued in Chinese Patent Application No. 201680054776.9.

* cited by examiner

BLOCK COPOLYMERS AS DISPERSANTS FOR ALKALI-ACTIVATED BINDERS

TECHNICAL FIELD

The invention relates to the use of a block copolymer as dispersant in a binder composition comprising an alkaline activating agent. The invention further pertains to a binder composition and also to a method for producing it. A further aspect of the invention relates to a shaped article obtainable from a binder composition.

PRIOR ART

Because of its production process, cement causes a massive emission of $CO_2$. In order to reduce these emissions, binder compositions are increasingly replacing some of the cement with latent hydraulic and/or pozzolanic cement additives such as fly ash, slag or silica dust, for example, which are obtained as secondary products in industrial operations and which are therefore positive factors in the $CO_2$ account. One problem resulting from the use of such additives is that the setting of these additives takes significantly more time than the setting of hydraulic cement, with drawbacks in particular for high early strengths. In order to get around this problem, it is possible for latent hydraulic and pozzolanic additives to be activated by addition of a suitable activating agent—by alkaline activating agents, for example.

In order to improve the workability of mineral binder compositions while minimizing water/binder ratio it is customary practice, moreover, to use so-called dispersants as plasticizers, thereby altering not only the consistency of the binder composition during working but also the properties in the fully cured state in an advantageous way. Examples of particularly effective dispersants known are polycarboxylate-based comb polymers. Such comb polymers possess a polymer backbone with side chains attached to it. Polymers of this kind are described for example in EP 1 138 697 A1 (Sika AG).

Likewise known as concrete admixtures are copolymer mixtures of the kind referred to for example in EP 1 110 981 A2 (Kao). The copolymer mixtures are prepared by reacting ethylenically unsaturated monomers in a free radical polymerization reaction, with the molar ratio of the two monomers being changed at least once during the polymerization process.

As has emerged, however, polycarboxylate-based comb polymers are generally extremely sensitive to heightened basic conditions. Consequently, such dispersants lose their effect after just a short time together with alkaline activating agents.

There is therefore a great demand for effective dispersants which can be used even in alkali-activated binder compositions.

SUMMARY OF THE INVENTION

It is an object of the invention, therefore, to provide an improved dispersant with which disadvantages above are overcome. The dispersant is to be able to be used in particular in alkali-activated binder compositions while at the same time remaining active for as long as possible, permitting effective plasticizing and high workability of the composition.

Surprisingly it has been found that this object can be achieved through the use of a block copolymer P as claimed in claim 1. A particular feature of the block copolymer P is that it comprises at least one first block A and at least one second block B, where the first block A has a monomer unit M1 of the formula I (as defined later on), and the second block B includes a monomer unit M2 of the formula II (as defined later on), and where any fraction of monomer units M2 present in the first block A is less than 25 mol %, more particularly less than or equal to 10 mol %, based on all the monomer units M1 in the first block A, and where any fraction of monomer units M1 present in the second block B is less than 25 mol %, more particularly less than or equal to 10 mol %, based on all the monomer units M2 in the second block B.

As has emerged, the block copolymers P used in accordance with the invention are surprisingly insensitive to alkaline conditions, of the kind prevailing, for example, in alkali-activated binder compositions with latent hydraulic and/or pozzolanic binders, and therefore permit very good workability and a high level of water reduction, in comparison to the use of known dispersants, particularly in comparison with comb polymers having a random distribution of the monomers.

This is evident in particular in that the difference in the fluidity of tempered binder compositions comprising comb polymer, with and without alkaline activating agents, is relatively small.

Accordingly, the block copolymers of the invention remain active over a relatively long time as dispersants or plasticizers, even in alkali-activated binder compositions, and permit a combination of high workability and low water/cement ratio.

The block copolymers of the invention can therefore be used advantageously especially for plasticizing, for reducing the water demand and/or for improving the workability of mineral binder compositions comprising alkaline activating agents.

Further aspects of the invention are subjects of further independent claims. Particularly preferred embodiments of the invention are subjects of the dependent claims.

CERTAIN EMBODIMENTS OF THE INVENTION

A first aspect of the present invention relates to the use of a block copolymer P as dispersant in a binder composition comprising at least one mineral binder and an alkaline activating agent, where the block copolymer P comprises at least one first block A and at least one second block B, the first block A having a monomer unit M1 of the formula I,

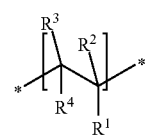 (I)

and the second block B including a monomer unit M2 of the formula II

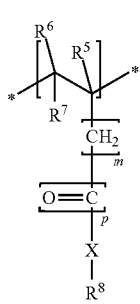

where
R$^1$, in each case independently of any other, is —COOM, —SO$_2$—OM, —O—PO(OM)$_2$ and/or —PO(OM)$_2$,
R$^2$, R$^3$, R$^5$ and R$^6$, in each case independently of one another, are H or an alkyl group having 1 to 5 carbon atoms,
R$^4$ and R$^7$, in each case independently of one another, are H, —COOM or an alkyl group having 1 to 5 carbon atoms,
or where R$^1$ with R$^4$ forms a ring to make —CO—O—CO—,
M, independently of any other, is H$^+$, an alkali metal ion, an alkaline earth metal ion, a di- or trivalent metal ion, an ammonium ion or an organic ammonium group;
m is 0, 1 or 2,
p is 0 or 1,
X, in each case independently of any other, is —O— or —NH—,
R$^8$ is a group of the formula -[AO]$_n$—R$^a$,
where A is C$_2$- to C$_4$-alkylene, R$^a$ is H, a C$_1$- to C$_{20}$-alkyl group, -cyclohexyl group or -alkylaryl group,
and n is 2-250, more particularly 10-200;
and where any fraction of monomer units M2 present in the first block A is less than 25 mol %, more particularly less than or equal to 10 mol %, based on all the monomer units M1 in the first block A, and where any fraction of monomer units M1 present in the second block B is less than 25 mol %, more particularly less than or equal to 10 mol %, based on all the monomer units M2 in the second block B.

In the block copolymer P there may be a plurality of different monomer units M1 of the formula I and/or a plurality of different monomer units M2 of the formula II.

The monomer units M1 and any further monomer units in the first block A are present in particular in statistical or random distribution. Similarly, the monomer units M2 and any further monomer units in the second block B are present in particular in statistical or random distribution.

In other words, the at least one block A and/or the at least one block B preferably each take the form of a partial polymer with random monomer distribution.

The at least one first block A comprises advantageously 5-70, more particularly 7-40, preferably 10-25, monomer units M1 and/or the at least one second block B comprises 5-70, more particularly 7-50, preferably 20-40, monomer units M2.

According to a further preferred embodiment, the first block A comprises 25-35 monomer units M1 and/or the at least one second block B comprises 20-40 monomer units M2.

The block copolymer P as a whole has a weight-average molecular weight M$_w$ in particular in the range of 10 000-150 000 g/mol, advantageously 12 000-80 000 g/mol, especially 12 000-50 000 g/mol. In the present context, molecular weights, such as the weight-average molecular weight M$_w$, are determined by gel permeation chromatography (GPC) with polyethylene glycol (PEG) as standard. This technique is known per se to the person skilled in the art.

In particular it is possible to analyze and determine the structure of the block copolymers by means of nuclear magnetic resonance spectroscopy (NMR spectroscopy). Through $^1$H and $^{13}$C NMR spectroscopy it is possible in particular and in a conventional way to determine the sequence of the monomer units in the block copolymer on the basis of neighboring-group effects in the block copolymer and by means of statistical evaluations.

Preferably any fraction of monomer units M2 present in the first block A is less than 15 mol %, more particularly less than 10 mol %, especially less than 5 mol % or less than 1 mol %, based on all the monomer units M1 in the first block A. Moreover, any fraction of monomer units M1 present in the second block B is advantageously less than 15 mol %, more particularly less than 10 mol %, especially less than 5 mol % or less than 1 mol %, based on all the monomer units M2 in the second block B. With advantage both conditions are met in unison.

With especial advantage, for example, any fraction of monomer units M2 present in the first block A is less than 15 mol % (based on all the monomer units M1 in the first block A) and any fraction of monomer units M1 present in the second block B is less than 10 mol % (based on all the monomer units M2 in the second block B).

Substantially, therefore, the monomer units M1 and M2 are physically separate, this being to the benefit of the dispersing effect of the block copolymer and being advantageous in relation to the delay problem.

Based on all the monomer units in the first block A, the first block A consists in particular to an extent of at least 20 mol %, more particularly at least 50 mol %, especially at least 75 mol % or at least 90 mol %, of monomer units M1 of the formula I. Based on all the monomer units in the second block B, the second block B consists advantageously to an extent of at least 20 mol %, more particularly at least 50 mol %, especially at least 75 mol % or at least 90 mol %, of monomer units M2 of the formula II.

In the block copolymer P, the molar ratio of the monomer units M1 to the monomer units M2 is situated in particular in the range of 0.5-6, more particularly 0.7-4, preferably 0.9-3.8, more preferably 1.0-3.7 or 2-3.5. As a result, an optimum dispersing effect in mineral binder compositions is achieved.

Particularly in the case of a molar ratio of the monomer units M1 to the monomer units M2 in the range of 1.5-6, preferably 1.8-5 or 2-3.5, the dispersing effect achieved in mineral binder compositions is good and at the same time particularly long-lasting.

For specific applications, however, different molar ratios may be advantageous.

Especially advantageous block copolymers P are those for which: R$^1$=—COOM; R$^2$ and R$^5$, in each case independently of one another, are H, —CH$_3$ or mixtures thereof; R$^3$ and R$^6$ in each case independently of one another are H or —CH$_3$, preferably H; R$^4$ and R$^7$ in each case independently of one another are H or —COOM, preferably H.

In particular $R^1$=—COOM, $R^2$=H or —CH$_3$, and $R^3$=$R^4$=H. Hence the block copolymer can be prepared on the basis of acrylic or methacrylic acid monomers, this being of interest from an economic standpoint. In the present context, moreover, with block copolymers P of this kind, there is a good dispersing effect in conjunction with little delay to the setting time.

Likewise advantageous may be block copolymers P where $R^1$=—COOM, $R^2$=H, $R^3$=H, and $R^4$=—COOM. Comb polymers of this kind can be prepared on the basis of maleic acid monomers.

The group X in monomer unit M2 is advantageously —O— (=oxygen atom) for at least 75 mol %, more particularly for at least 90 mol %, especially for at least 95 mol % or at least 99 mol %, of all monomer units M2.

Advantageously $R^5$=H or —CH$_3$, $R^6$=$R^7$=H, and X=—O—. Block copolymers P of this kind can be prepared, for example, starting from (meth)acrylic esters, vinyl ethers, (meth)allyl ethers or isoprenol ethers.

In the case of one particularly advantageous embodiment, $R^2$ and $R^5$ are each mixtures of 40-60 mol % H and 40-60 mol % —CH$_3$.

According to a further advantageous embodiment, $R^1$=—COOM, $R^2$=H, $R^5$=—CH$_3$, and $R^3$=$R^4$=$R^6$=$R^7$=H.

In the case of another advantageous embodiment $R^1$=—COOM, $R^2$=$R^5$=H or —CH$_3$, and $R^3$=$R^4$=$R^6$=$R^7$=H.

The radical $R^8$ in monomer unit M2, based on all the radicals $R^8$ in the block copolymer P, consists in particular to an extent of at least 50 mol %, more particularly at least 75 mol %, preferably at least 95 mol % or at least 99 mol %, of a polyethylene oxide. A fraction of ethylene oxide units, based on all the alkylene oxide units in the block copolymer P, is in particular more than 75 mol %, more particularly more than 90 mol %, preferably more than 95 mol %, and especially 100 mol %.

In particular, $R^8$ has substantially no hydrophobic groups, more particularly no alkylene oxides having three or more carbon atoms. This means more particularly that a fraction of alkylene oxides having three or more carbon atoms, based on all the alkylene oxides, is less than 5 mol %, more particularly less than 2 mol %, preferably less than 1 mol % or less than 0.1 mol %. In particular there are no alkylene oxides having three or more carbon atoms present, or the fraction thereof is 0 mol %.

$R^a$ advantageously is H and/or a methyl group. With particular advantage, A=C$_2$-alkylene and $R^a$ is H or a methyl group.

In particular the parameter n=10-150, preferably n=15-100, more preferably n=17-70, especially n=19-45 or n=20-25. In particular in the stated preference ranges, excellent dispersing effects are obtained as a result.

It may, further, be advantageous if the block copolymer P comprises at least one further monomer unit MS, which in particular is chemically different from the monomer units M1 and M2. In particular there may be two or more different further monomer units MS. As a result, the properties of the block copolymer P can be modified further and adapted, for example, in relation to specific applications.

With particular advantage the at least one further monomer unit MS is a monomer unit of the formula III:

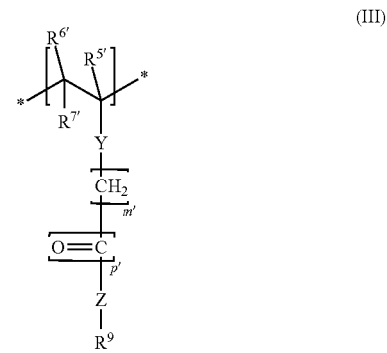

where
$R^{5'}$, $R^{6'}$, $R^{7'}$, m' and p' are defined like $R^5$, $R^6$, $R^7$, m and p;
Y, in each case independently of any other, is a chemical bond or —O—;
Z, in each case independently of any other, is a chemical bond, —O— or —NH—;
$R^9$, in each case independently of any other, is an alkyl group, cycloalkyl group, alkylaryl group, aryl group, hydroxyalkyl group or an acetoxyalkyl group, in each case having 1-20 carbon atoms.

Advantage is possessed, for example, by monomer units MS where m'=0, p'=0, Z and Y are a chemical bond, and $R^9$ is an alkylaryl group having 6-10 carbon atoms.

Also suitable are in particular in the case of monomer units MS for which m'=0, p'=1, Y is —O—, Z is a chemical bond, and $R^9$ is an alkyl group having 1-4 C atoms.

Additionally suitable are monomer unit MS where m' is 0, p' is 1, Y is a chemical bond, Z is —O—, and $R^9$ is an alkyl group and/or a hydroxyalkyl group having 1-6 carbon atoms.

With particular advantage the at least one further monomer unit MS consists of copolymerized vinyl acetate, styrene and/or hydroxyalkyl (meth)acrylate, more particularly hydroxyethyl acrylate.

The at least one further monomer unit MS may be part of the first block A and/or the second block B. It is also possible for the at least one further monomer unit MS to be part of an additional block of the block copolymer P. In the various blocks, in particular, there may be different monomer units MS.

If present in the first block A, the at least one further monomer unit MS in the first block A advantageously has a fraction of 0.001-80 mol %, preferably 20-75 mol %, especially 30-70 mol %, based on all the monomer units in the first block A.

If present in the second block B, the at least one further monomer unit MS in the second block B in particular has a fraction of 0.001-80 mol %, preferably 20-75 mol %, especially 30-70 mol % or 50-70 mol %, based on all the monomer units in the second block B.

According to one advantageous embodiment, in the first block A and/or in the second block B, the at least one further monomer unit MS is present with a fraction of 20-75 mol %, especially 30-70 mol %, based on all the monomer units in the respective block.

According to a further advantageous embodiment there is at least one further block C arranged between the first block A and the second block B, and this block C differs chemically and/or structurally from the first and from the second blocks.

The at least one further block C advantageously comprises monomer units MS as described above, or consists of such units. In addition to or instead of the monomer units MS, however, there may also be further monomer units present.

More particularly the at least one further block C consists to an extent of at least 50 mol %, more particularly at least 75 mol %, preferably at least 90 mol % or at least 95 mol %, of monomer units MS as described above.

According to one particularly advantageous embodiment, the block copolymer P is a diblock copolymer, consisting of a block A and a block B.

Likewise suitable for the inventive use are block copolymers P which comprise at least two blocks of the first block A and/or at least two blocks of the second block B. More particularly these are block copolymers P which contain the first block A twice and the second block B once, or are block copolymers P which contain the first block A once and the second block B twice. Block copolymers of this kind take the form more particularly of triblock copolymers, tetrablock copolymers or pentablock copolymers, preferably triblock copolymers. In the case of the tetrablock copolymers and the pentablock copolymers there are one or two further blocks present, examples being blocks of block C type as described above.

One particularly advantageous block copolymer P has at least one or more of the following features:
(i) block A has 7-40, more particularly 10-25 or 25-35, monomer units M1 and block B has 7-50, more particularly 20-40, monomer units M2;
(ii) the first block A consists, based on all the monomer units in the first block A, to an extent of at least 75 mol %, preferably at least 90 mol %, of monomer unit M1 of the formula I;
(iii) the second block B consists, based on all the monomer units in the second block B, to an extent of at least 75 mol %, preferably at least 90 mol %, of monomer units M2 of the formula II;
(iv) a molar ratio of the monomer units M1 to the monomer units M2 in the block copolymer is in the range of 0.5-6, preferably 0.8-3.5;
(v) $R^1$ is COOM;
(vi) $R^2$ and $R^5$ are H or $CH_3$, preferably $CH_3$;
(vii) $R^3=R^4=R^6=R^7=H$;
(viii) m=0 and p=1;
(ix) X=—O—
(x) A=$C_2$-alkylene and n=10-150, preferably 15-50;
(xi) $R^a$=H or —$CH_3$, preferably —$CH_3$.

Especially preferred is a diblock copolymer P consisting of blocks A and B that has at least all of the features (i)-(iv). Further preferred here is a diblock copolymer P which has all of the features (i)-(xi). Even more preferred is a diblock copolymer P which realizes all of features (i)-(xi) in the versions preferred in each case.

Likewise advantageous is a triblock copolymer P consisting of the blocks A, B and C, more particularly in the order A-C-B, where the triblock copolymer P has at least all of the features (i)-(iv). Further preferred here is a triblock copolymer P which has all of the features (i)-(xi). Even further preferred is a triblock copolymer P which realizes all of the features (i)-(xi) in the versions preferred in each case. Block C in this case advantageously comprises monomer units MS as described above, or block C consists of such units.

In one specific embodiment, moreover, in these diblock copolymers P or triblock copolymers P, there is additionally a further monomer unit MS as described above in blocks A and B, more particularly a further monomer unit MS of the formula III.

The block copolymer is in particular a polymer having a substantially linear structure. This means in particular that all of the monomer units of the block copolymer are arranged in a single and/or unbranched polymer chain. Specifically, the block copolymer does not have a star-shaped structure and/or the block copolymer is not part of a branched polymer. More particularly the block copolymer is not part of a polymer in which attached on a central molecule there are a plurality of, more particularly three or more, polymer chains extending in different directions.

The block copolymer may be present in liquid or solid form. With particular preference the block copolymer is present as a constituent of a solution or dispersion, with the fraction of the block copolymer being in particular 10-90 wt % preferably 25-65 wt %. In this way it is possible for the block copolymer, for example, to be added very effectively to binder compositions. If the block copolymer is prepared in solution, especially in aqueous solution, moreover, there is no need for further treatment.

In accordance with another advantageous embodiment, the block copolymer is present in the solid aggregate state, more particularly in the form of a powder, in the form of pellets and/or plates. This makes it easier in particular to transport the block copolymers. Solutions or dispersions of the block copolymers can be converted into the solid aggregate state by means, for example, of spray drying.

A further aspect of the present invention relates to a process for preparing a block copolymer, comprising a step of
a) polymerizing monomers m1 of the formula IV

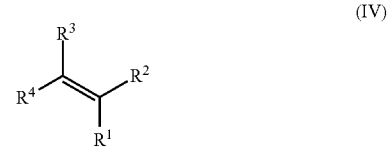

(IV)

and also a step of
b) polymerizing monomers m2 of the formula V

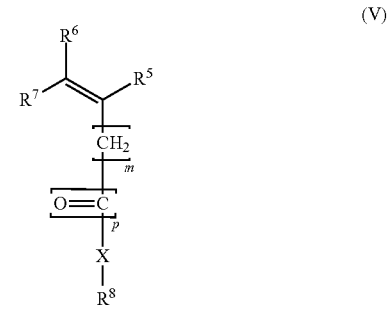

(V)

where $R^1$, $R^2$, $R^3$, $R^4$, $R^5$, $R^6$, $R^7$, $R^8$, m, p and X are defined as above and where in step a) any fraction of monomer m2 present is less than 25 mol %, more particularly less than or equal to 10 mol %, based on the monomers m1;

and in step b) any fraction of monomer m1 present is less than 25 mol %, more particularly less than or equal to 10 mol %, based on the monomers m2;

and where the steps a) and b) are performed in temporal succession in any order.

The polymerization in step a) is carried out in particular until 75-95 mol %, preferably 85-95 mol %, more particularly 86-92 mol % of the monomers m1 originally introduced have undergone reaction or polymerization.

In particular, the polymerization in step b), accordingly, is carried out until 75-95 mol %, more particularly 80-92 mol %, of the monomers m2 originally introduced have undergone reaction or polymerization.

The conversion of the monomers m1 and m2, or the progress of the polymerization in steps a) and b), can be monitored, for example, by means of liquid chromatography, especially high-performance liquid chromatography (HPLC), in a way which is known per se.

As it has emerged, it is advantageous to react the monomers m1 and m2 in steps a) and b) until the conversion rates specified above have been reached. It is advantageous, moreover, to carry out steps a) and b) immediately following one another, irrespective of the sequence selected. By this means it is possible ideally to maintain the polymerization reaction in steps a) and b).

The process can be carried out, for example, by introducing monomers m1 in a solvent, e.g., water, in step a) and then polymerizing them to form a first block A. As soon as the desired conversion of monomer m1 has been reached (e.g., 75-95 mol %, more particularly 80-92 mol %; see above), without any time delay, monomers m2 are added in step b) and the polymerization is continued. Here, the monomers m2 are added in particular onto the block A already formed, to form a second block B. The polymerization is advantageously continued in turn until the desired conversion rate of monomer m2 has been reached (e.g., 75-95 mol %, more particularly 80-92 mol %; see above). This produces, for example, a diblock copolymer comprising a first block A and, connected to it, a second block B.

According to a further advantageous embodiment, in step a) and/or in step b), there is at least one further polymerizable monomer ms. The at least one further polymerizable monomer ms in this case is polymerized in particular together with the monomer m1 and/or the monomer m2.

It is also possible, however, in addition to step a) and step b), to provide a further step c) of the polymerization of the at least one further polymerizable monomer ms. By this means it is possible to prepare a block copolymer having an additional block C. In particular, in terms of time, step c) is carried out between step a) and step b). The additional block C, accordingly, is arranged physically between the blocks A and B.

The at least one further polymerizable monomer ms, independently of how it is integrated into the block copolymer, is more particularly a monomer of the formula VI

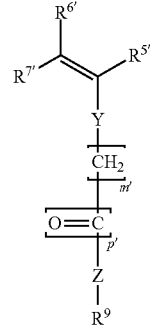

(VI)

where
$R^{5'}$, $R^{6'}$, $R^{7'}$, $R^9$, m', p', Y and Z are as defined above.

Advantageous fractions, proportions, and embodiments of the monomers m1, m2, ms and of any further monomers correspond to the fractions, proportions, and embodiments already stated above, described in connection with those of the monomer units M1, M2 and MS.

With particular advantage the at least one further monomer ms is selected from vinyl acetate, styrene, N-vinylpyrrolidone and/or hydroxyalkyl (meth)acrylate, more particularly hydroxyethyl acrylate.

The polymerization in step a) and/or in step b) takes place preferably in an aqueous solution. More particularly, the polymerizations in both steps a) and b) take place in aqueous solutions. This is also the case, correspondingly, for step c), where such a step is carried out. As it has emerged, this has positive consequences for the dispersing effect of the block copolymer.

It is, however, also possible to provide other solvents, ethanol being an example.

The polymerization in step a) and/or b) takes place with advantage by a free radical polymerization, preferably by a living radical polymerization, more particularly by reversible addition-fragmentation chain transfer polymerization (RAFT). This is also true, accordingly, of step c), where such a step is carried out.

A radical polymerization can be divided into three steps: initiation, propagation, and termination. In free radical polymerization, as described for example in EP 1 110 981 A2 (Kao), all three steps run in parallel. The lifetime of the active, growing chains is very small in each case, and the monomer concentration during the chain propagation of a chain remains substantially constant. The polymer chains formed in this way do not possess any active centers suitable for the adding-on of further monomers. This mechanism, therefore, does not allow any control over the structure of the polymers. Typically, therefore, it is not possible to prepare block structures by means of conventional free radical polymerization.

In contrast to this, controlled radical polymerizations or living radical polymerization are distinguished by the complete absence of, or else by reversible, termination or transfer reactions. After initiation has taken place, accordingly, the active centers are retained throughout the reaction. All of the polymer chains are formed (initiated) simultaneously and they grow continuously over the entire time. Ideally, the radical functionality of the active center is retained even after full conversion of the monomers to be polymerized. This particular quality of controlled polymerizations makes it possible, through sequential addition of different monomers, to prepare well-defined structures such as block polymers (see, for example, "Polymere: Synthese, Synthese and Eigenschaften"; authors: Koltzenburg, Maskos, Nuyken; publisher: Springer Spektrum; ISBN: 97-3-642-34772-6, and also "Fundamentals of Controlled/living Radical Polymerization"; publisher: Royal Society of Chemistry; editors: Tsarevsky, Sumerlin; ISBN: 978-1-84973-425-7).

Employed as initiator for the polymerizations in particular is a radical initiator, preferably an azo compound and/or a peroxide. Suitable peroxides are selected for example from the group consisting of dibenzoyl peroxide (DBPO), di-tert-butyl peroxide, and diacetyl peroxide.

A particularly advantageous initiator is an azo compound, such as azobisisobutyronitrile (AIBN), α,α'-azodiisobutyramidine dihydrochloride (AAPH) and/or azobisisobutyramidine (AIBA), for example. In certain circumstances, however, other radical initiators, such as sodium persulfate or di-tert-butyl hyponitrite, may also be used.

If the polymerization takes place in an aqueous solution or in water, an initiator used with advantage is α,α'-azodiisobutyramidine dihydrochloride (AAPH).

Present preferably in step a) and/or in step b) are one or more representatives from the group consisting of dithioesters, dithiocarbamates, trithiocarbonates and xanthates. These are so-called "RAFT agents", which make it possible to control the polymerization process. This is also true, correspondingly, for step c), where such a step is carried out.

The polymerization in step a), step b) and/or step c) takes place more particularly at a temperature in the range of 50-95° C., especially 70-90° C.

It is advantageous to operate under an inert gas atmosphere, as for example under a nitrogen atmosphere.

In the case of one particularly preferred process, step b) is performed before step a).

According to an advantageous process, step b) is performed before step a) and there are no other polymerization steps anymore. In this way, simply, a diblock copolymer is obtainable.

The block copolymer used in accordance with the invention is obtainable in particular by the process described above or is prepared by the process described above. For the present purposes, a "binder composition" refers in particular to a composition comprising at least one mineral binder.

The expression "mineral binder" refers in particular to a binder which reacts in the presence of water and optionally an activating agent to form solid hydrates or hydrate phases. This may be, for example, a hydraulic binder (e.g., cement or hydraulic lime), a latent hydraulic binder (e.g., slag), a pozzolanic binder (e.g., fly ash), or a nonhydraulic binder (e.g., gypsum or white lime).

The expression "latent hydraulic and/or pozzolanic binders" is used in the present context to refer in particular to binders which harden or set hydraulically only through the action of adjuvants or activating agents. These are, in particular, reactive admixtures of type II according to standard EN 1045-2.

The term "alkaline activating agent" refers presently in particular to a basic or alkaline substance. This means more particularly a substance which when added to an aqueous solution has the capacity to raise the pH of that solution. An alkaline activating agent in the present context is, specifically, a substance suitable for activating the setting or hardening of latent hydraulic and/or pozzolanic binders.

The binder composition is, in particular, an alkali-activated binder composition which in addition to the binder further comprises an alkaline activating agent. More particularly the binder composition comprises an alkaline activating agent for the activation of a latent hydraulic and/or pozzolanic binder. The alkali-activated binder composition here possesses in particular a higher pH than an analogous binder composition which is not activated or contains no alkaline activating agent. The alkaline activating agent may be present in free form or dissolved form, as a salt, for example, and/or may have undergone at least partial reaction with the binder.

The pH of the alkali-activated binder composition which in addition to the binder further comprises an alkaline activating agent possesses in particular a pH which is greater by at least 0.1, in particular by at least 0.5, especially at least 1.0, very particularly by at least 1.5, than the pH of the analogous binder composition which is not activated or contains no alkaline activating agent. The activating agent is present, accordingly, in particular with a corresponding proportion, or is added or used with a corresponding proportion in order to achieve such an increase in pH.

The binder composition preferably comprises or consists of a latent hydraulic and/or pozzolanic binder. Possible latent hydraulic and/or pozzolanic binders are, in particular, slags, pozzolans, fly ashes, silica dust, volcanic ashes, metakaolins, rice husks, burnt shale and/or calcined clay. Preferred latent hydraulic and/or pozzolanic binders comprise slags, pozzolans, fly ashes and/or silica dust. Particularly preferred presently are slag and/or fly ash.

The binder composition is in particular a cementitious or cement-containing binder composition. The cement fraction in the binder composition is especially at least 5 wt %, more particularly 5-95 wt %, preferably 60-80 wt %. An example of a suitable cement is a Portland cement. However, it is also possible to make use, for example, of calcium aluminate cements, Portland limestone cements and/or belite-rich sulfoaluminate cements.

In one advantageous embodiment the binder composition has 5-95 wt %, more particularly 15-50 wt %, very preferably 20-40 wt % of latent hydraulic and/or pozzolanic binder, and also 5-95 wt %, preferably 60-80 wt %, of hydraulic binder. The hydraulic binder here is advantageously a cement, more particularly a Portland cement.

The binder composition, additionally to or instead of the components identified above, may for example also include other hydraulic binders, e.g., hydraulic lime. Similarly, the binder composition may also comprise nonhydraulic binders, examples being gypsum, anhydrite and/or white lime.

Further, the binder composition may comprise inert substances, examples being pigments, limestone and/or finely ground quartzes. It may do so in particular in combination with latent hydraulic and/or pozzolanic binders. As a result, a part of the latent hydraulic and/or pozzolanic binders may be replaced by inert substances, limestone for example.

The alkaline activating agent advantageously comprises an alkali metal salt and/or alkaline earth metal salt. More particularly this is an alkali metal hydroxide, an alkaline earth metal hydroxide, an alkali metal oxide, an alkaline earth metal oxide, an alkali metal carbonate, an alkali metal sulfate and/or an alkali metal silicate. The alkaline activating agent is selected more particularly from NaOH, $Na_2CO_3$, $Na_2O$, $Na_2SO_4$, Na silicate, KOH, K silicate, CaO, $Ca(OH)_2$, or mixtures thereof.

In the case of the Na silicate, the substance more particularly is a sodium metasilicate or waterglass, particularly with the formula $Na_2SiO_3$. The K silicate is more particularly a potassium metasilicate or waterglass, especially with the formula $K_2SiO_3$.

According to one preferred embodiment, the activating agent comprises an alkali metal hydroxide, an alkali metal sulfate and/or an alkali metal silicate, or the activating agent consists thereof. In particular this compound is a sodium sulfate, potassium sulfate, sodium hydroxide, potassium hydroxide, sodium silicate and/or potassium silicate. Especially preferred are sodium sulfate, sodium hydroxide and/or sodium silicate.

With particular preference the activating agent comprises or consists of an alkali metal salt.

In a further preferred embodiment, the activating agent comprises an alkali metal hydroxide, alkali metal carbonate and/or an alkali metal sulfate. Preferred are NaOH, KOH, $Na_2CO_3$ and/or $Na_2SO_4$. Particularly preferred is an alkali metal hydroxide and/or an alkali metal carbonate. More particularly the activating agent is NaOH and/or $Na_2CO_3$, preferably NaOH.

Activating agents of this kind bring about particularly strong activation of the latent hydraulic and/or pozzolanic binders and are also compatible with the block copolymers P of the invention. In principle, however, other activating agents can also be used.

With advantage, the fraction of the alkaline activating agent is 0.001-10 wt %, more particularly 0.1-5 wt %, very preferably 0.2-1.5 wt % or 0.5-1.5 wt %, based in each case on the weight of the binder. The concentrations are based in particular on the overall weight of the binder.

A further aspect of the invention relates to a binder composition comprising at least one mineral binder, an alkaline activating agent, and a block copolymer P as defined above. The alkaline activating agent is with advantage an alkaline activating agent as described above. Binder compositions of this kind can be used, together for example with aggregates such as sand, gravel and/or graded rock, for the production of mortars and/or concrete.

The mineral binder advantageously comprises a latent hydraulic and/or pozzolanic binder or consists thereof.

The binder composition is in particular a mineral binder composition which can be made up with water and/or is workable.

The weight ratio of water to binder in the binder composition is preferably in the range of 0.25-0.7 wt %, more particularly 0.26-0.65 wt %, preferably 0.27-0.60 wt %, especially 0.28-0.55 wt %.

The block copolymer P is used advantageously with a fraction of 0.01-10 wt %, more particularly 0.1-7 wt %, especially 0.2-5 wt %, based on the binder content. The fraction of the block copolymer P in this case is based on the block copolymer P per se. In the case of a block copolymer P in the form of a solution, accordingly, it is the solids content which is critical.

An additional aspect of the present invention pertains to a shaped article, more particularly a constituent of a construction, obtainable by fully curing a binder composition as described above, following addition of water.

A construction may be, for example, a bridge, a building, a tunnel, a roadway, or a runway.

A further aspect of the present invention relates to a method for producing a binder composition. In this method a mineral binder, which in particular comprises or consists of a latent hydraulic and/or pozzolanic binder, is mixed with a block copolymer P, as described above, and with an alkaline activating agent.

According to one preferred method, the tempering water for the binder composition is premixed with the activating agent and subsequently the block copolymer P is admixed. In a subsequent step, the tempering water, containing the block copolymer P and optionally the activating agent, is then mixed with the binder. This has proven advantageous in relation to extremely good activity of the block copolymer P in the binder composition.

It is, however, also possible first to mix the activating agent with the mineral binder, with a portion of the tempering water, for example, and subsequently to admix the block copolymer P, with a further portion of the tempering water, for example.

Further advantageous embodiments of the invention are apparent from the working examples hereinafter.

WORKING EXAMPLES

1. Preparation Examples for Polymers
1.1 Diblock Copolymer P1

For the preparation of the diblock copolymer P1 by RAFT polymerization, a round-bottom flask equipped with a reflux condenser, agitator, thermometer, and inert gas inlet tube is charged with 57.4 g of 50% methoxy-polyethylene glycol 1000 methacrylate (0.03 mol) and 24.9 g of deionized water. The reaction mixture is heated to 80° C. with vigorous stirring. A gentle stream of inert gas is passed through the solution during heating and for the whole of the rest of the reaction time. Added to the mixture then are 756 mg of 4-cyano-4-(thiobenzoyl)pentanoic acid (2.7 mmol). When the substance has fully dissolved, 135 mg of AIBN (0.82 mmol) are added. From this point on the conversion is ascertained regularly by HPLC.

As soon as the conversion, based on methoxy-polyethylene glycol methacrylate, is more than 80%, 5.85 g of acrylic acid (0.08 mol) are added to the reaction mixture. The mixture is reacted for a further 4 h and then left to cool. This leaves a clear, slightly reddish, aqueous solution having a solids content of around 40%.

1.2 Diblock Copolymer P2

For the preparation of the diblock copolymer P2 by RAFT polymerization, a round-bottom flask equipped with a reflux condenser, agitator, thermometer, and inert gas inlet tube is charged with 347.21 g of 48% methoxy-polyethylene glycol 2000 methacrylate (0.08 mol) and 112.2 g of deionized water. The reaction mixture is heated to 80° C. with vigorous stirring. A gentle stream of inert gas is passed through the solution during heating and for the whole of the rest of the reaction time. Added to the mixture then are 2.27 g of 4-cyano-4-(thiobenzoyl)pentanoic acid (0.008 mol). When the substance has fully dissolved, 404 mg of AIBN (0.0024 mol) are added. From this point on the conversion is ascertained regularly by HPLC.

As soon as the conversion, based on methoxy-polyethylene glycol methacrylate, is more than 80%, 23.78 g of acrylic acid (0.33 mol) are added to the reaction mixture. The mixture is reacted for a further 4 h and then left to cool. This leaves a clear, slightly reddish, aqueous solution having a solids content of around 40%.

1.3 Statistical Polymer P3

In a reaction vessel equipped with a mechanical agitator, thermometer and reflux condenser, 234 g of water, 60 g of maleic anhydride (0.6 mol), 520 g of allyl-polyethylene glycol ether (0.47 mol; average molecular weight 1100 g/mol) were 2. Mortar Mixtures 2.1 Preparation The mortar mixture used for test purposes has the dry composition described in table 1:

TABLE 1

Dry composition of mortar mixture

| Component | Amount [g] |
| --- | --- |
| Cement (CEM I 42.5 N; Normo 4; available from Holcim Switzerland) | 525 g |
| Slag (Löruns) | 225 g |
| Limestone filler | 141 g |
| Sand 0-1 mm | 738 g |
| Sand 1-4 mm | 1107 g |
| Sand 4-8 mm | 1154 g |

In order to make up a mortar mixture, the sands, the limestone filler, the cement and the slag were mixed dry in a Hobart mixer for 1 minute. Over the course of 30 seconds, the tempering water (water-to-cement ratio w/c=0.44) was added, and mixing was continued for 2.5 minutes. The total wet mixing time lasted 3 minutes in each case.

In advance, before the addition to the mortar mixture, the respective polymer (proportion: 0.32 wt %; based on solids content of the polymer and based on cement content) and also, where appropriate, a basic activating agent (NaOH; 1.25 wt % based on binder content (cement plus slag)) were admixed to the tempering water. Where both a polymer and a basic activating agent were admixed, the basic activating agent was added to the tempering water before the polymer was added.

2.2 Mortar Tests

To determine the dispersing effect of the polymers, the flow value (ABM) of made-up mortar mixtures was measured in each case at various times. The flow value (ABM) of the mortar was determined in accordance with EN 1015-3.

Further, the effect of the polymers on the hydration behavior of mineral binder compositions was ascertained by measuring the temperature profile of mortar mixtures over time, after having been made up with water. The temperature measurement took place under adiabatic conditions, using a thermocouple as temperature sensor, in a conventional way. All the samples were measured under the same conditions. The measure taken for the solidification time in the present case is the time [t(TM)] which elapses from the making-up of the mortar mixture through to the attainment of the temperature maximum occurring after the induction phase or resting phase.

2.3 Results of the Mortar Tests

Table 2 gives an overview of the mortar tests conducted and the results obtained in the tests. Test T1 is a blank test carried out for comparative purposes, without addition of polymer.

TABLE 2

Mortar test results

| No. | Polymer[+] | Activating agent[*] | ABM[#] [mm] after | | | | t (TM) [h] |
| --- | --- | --- | --- | --- | --- | --- | --- |
| | | | 0 min | 30 min | 60 min | 90 min | |
| T1 | — | — | <120 | n.m. | n.m. | n.m. | |
| T2 | P3 | — | 232 | 187 | 161 | 142 | 18.0 |
| T3 | P3 | NaOH | 187 (−19%) | 150 (−20%) | 139 (−14%) | 130 (−9%) | 15.5 |
| T4 | P1 | — | 273 | 254 | 239 | 229 | 18.2 |
| T5 | P1 | NaOH | 275 (+1%) | 258 (+2%) | 249 (+4%) | 234 (+2%) | 17.0 |
| T6 | P2 | — | 263 | 252 | 249 | 226 | 14.2 |
| T7 | P2 | NaOH | 263 (−0%) | 229 (−9%) | 208 (−17%) | 176 (−22%) | 14.8 | n.m. = not measurable

[+]polymer content = 0.32 wt % based on solids content of polymer and cement content.

[*]activating agent content = 1.25 wt % based on binder content.

[#]= flow value as per EN 1015-3. The time "0 min" corresponds to the first measurement immediately after the mortar sample was made up. The percentage figure in parentheses in the case of the tests with NaOH corresponds to the percentage change in flow value, relative to the flow value in the line above for the corresponding test without NaOH.

The tests show clearly that when using block copolymers P1-P2 (see tests T4-T7), the percentage change in the flow value from the addition of NaOH, at least at early times, turns out clearly to be lower than when using the reference polymer P3 (see tests T2 and T3). It is evident, furthermore, that when the block copolymers of the invention are added at an equal dosage, in absolute terms, they have a clearly better plasticizing performance, which, moreover, is also maintained at a relatively high level for longer times.

From the results presented, therefore, the conclusion is that in a variety of respects the block copolymers of the invention are advantageous over known polymers. In particular, with the polymers of the invention, high dispersing effects and plasticizing effects can be achieved, and can also be maintained for a comparatively long time at a level which is of interest for practice. Moreover, the polymers of the invention are clearly less susceptible to alkaline activating agents than conventional polymers.

The embodiments described above, however, should be understood merely as illustrative examples, which may be modified as desired within the scope of the invention.

The invention claimed is:

1. A method comprising applying a block copolymer P as dispersant in a binder composition comprising at least one mineral binder and an alkaline activating agent, wherein:
the at least one mineral binder comprises a latent hydraulic binder and/or a pozzolanic binder,
the alkaline activating agent is one or more member selected from the group consisting of an alkali metal hydroxide, an alkaline earth metal hydroxide, an alkali metal oxide, an alkaline earth metal oxide, an alkali metal carbonate, an alkali metal sulfate and an alkali metal silicate,
a fraction of the alkaline activating agent is 0.001-10 wt %, based on the total weight of the binder composition,
the block copolymer P comprises at least one first block A and at least one second block B, the at least one first block A comprising 5-70 monomer units M1, and the at least one second block B comprising 5-70 monomer units M2,
each of the monomer units M1 being represented by formula I:

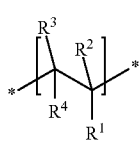

(I)

each of the monomer units M2 being represented by formula II:

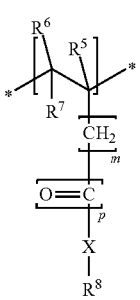

(II)

where:
$R^1$, in each case independently of any other, is —COOM, —SO$_2$—OM, —O—PO(OM)$_2$, or —PO(OM)$_2$,
$R^2$, $R^3$, $R^5$ and $R^6$, in each case independently of one another, are H or an alkyl group having 1 to 5 carbon atoms,
$R^4$ and $R^7$, in each case independently of one another, are H, —COOM, or an alkyl group having 1 to 5 carbon atoms, or $R^1$ with $R^4$ forms a ring to make —CO—O—CO—, M, in each case independently of any other, is H$^+$, an alkali metal ion, an alkaline earth metal ion, a di- or trivalent metal ion, an ammonium ion, or an organic ammonium group;
m is 0, 1, or 2,
p is 0 or 1,
X, in each case independently of any other, is —O— or —NH—, and
$R^8$ is a group represented by formula -[AO]$_n$—$R^a$, where A is C$_2$- to C$_4$-alkylene, $R^a$ is H, a C$_1$- to C$_{20}$-alkyl group, -cyclohexyl group or -alkylaryl group, and n is 2-250; wherein
a fraction of monomer units M2 represented by formula II present in the first block A is less than 25 mol % based on all the monomer units M1 in the first block A,
a fraction of monomer units M1 represented by formula I present in the second block B is less than 25 mol % based on all the monomer units M2 in the second block B, and
the block copolymer P does not comprise any further monomeric units other than the monomer units M1 and the monomer units M2.

2. The method as claimed in claim 1, wherein:
the first block A of the block copolymer P consists of 25-35 monomer units M1, and
the second block B of the block copolymer P consists of 10-20 monomer units M2.

3. The method as claimed in claim 1, wherein the block copolymer P has a molar ratio of the monomer units M1 to the monomer units M2 in a range of 0.5-6.

4. The method as claimed in claim 1, wherein:
the first block A of the block copolymer P includes at least 20 mol % of monomer units M1, based on all the monomer units in the first block A, and/or
the second block B includes at least 20 mol % of monomer units M2, based on all the monomer units in the second block B.

5. The method as claimed in claim 1, wherein in the block copolymer P:
$R^1$ is —COOM;
$R^2$ and $R^5$, independently of one another, are H, —CH$_3$, or mixtures thereof;
$R^3$ and $R^6$, independently of one another, are H or —CH$_3$;
$R^4$ and $R^7$, independently of one another are H or —COOM; and
X for at least 75 mol % of all monomer units M2 is —O—.

6. The method as claimed in claim 1, wherein in the block copolymer P, n is 10-150.

7. The method as claimed in claim 1, wherein the block copolymer P is a diblock copolymer consisting of the first block A and the second block B.

8. The method as claimed in claim 1, wherein the at least one mineral binder consists of a latent hydraulic binder and/or a pozzolanic binder.

9. The method as claimed in claim 8, wherein the binder composition is 5-95 wt % of a hydraulic binder.

10. The method as claimed in claim 1, wherein the alkaline activating agent comprises an alkali metal hydroxide, an alkali metal carbonate, and/or an alkali metal sulfate.

11. The method as claimed in claim 10, wherein the alkaline activating agent comprises an alkali metal hydroxide and/or an alkali metal carbonate.

12. The method as claimed in claim 10, wherein the alkaline activating agent comprises an alkali metal hydroxide.

13. The method as claimed in claim 1, wherein the alkaline activating agent is one or more member selected from the group consisting of NaOH, $Na_2CO_3$, $Na_2O$, $Na_2SO_4$, Na silicate, KOH, K silicate, CaO, and $Ca(OH)_2$.

14. The method as claimed in claim 1, wherein the latent hydraulic and/or pozzolanic binder contains at least one member selected from the group consisting of slags, pozzolans, fly ashes and silica dust.

15. A method comprising applying a block copolymer P as dispersant in a binder composition comprising at least one mineral binder and an alkaline activating agent, wherein:
   the at least one mineral binder comprises a latent hydraulic binder and/or a pozzolanic binder;
   the alkaline activating agent is one or more member selected from the group consisting of an alkali metal hydroxide, an alkaline earth metal hydroxide, an alkali metal oxide, an alkaline earth metal oxide, an alkali metal carbonate, an alkali metal sulfate and an alkali metal silicate;
   a fraction of the alkaline activating agent is 0.001-10 wt %, based on the total weight of the binder composition;
   the block copolymer P consists of a monomer unit M1, a monomer unit M2 and a monomer unit MS, which are arranged in at least one first block A and at least one second block B, the at least one first block A containing 5-70 monomer units M1, and the at least one second block B containing 5-70 monomer units M2;
   the monomer unit M1 being represented by formula I:

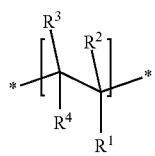

(I)

the monomer unit M2 being represented by formula II:

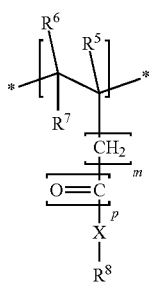

(II)

where:
      $R^1$, in each case independently of any other, is —COOM, —$SO_2$—OM, —O—$PO(OM)_2$, or —$PO(OM)_2$,
      $R^2$, $R^3$, $R^5$ and $R^6$, in each case independently of one another, are H or an alkyl group having 1 to 5 carbon atoms,
      $R^4$ and $R^7$, in each case independently of one another, are H, —COOM, or an alkyl group having 1 to 5 carbon atoms, or $R^1$ with $R^4$ forms a ring to make —CO—O—CO—,
      M, in each case independently of any other, is $H^+$, an alkali metal ion, an alkaline earth metal ion, a di- or trivalent metal ion, an ammonium ion, or an organic ammonium group;
      m is 0, 1, or 2,
      p is 0 or 1,
      X, in each case independently of any other, is —O— or —NH—, and
      $R^8$ is a group represented by formula -$[AO]_n$—$R^a$, where A is $C_2$- to $C_4$-alkylene, $R^a$ is H, a $C_1$- to $C_{20}$-alkyl group, -cyclohexyl group or -alkylaryl group, and n is 2-250;
   a fraction of monomer units M2 represented by formula II present in the first block A is less than 25 mol % based on all the monomer units M1 in the first block A;
   a fraction of monomer units M1 represented by formula I present in the second block B is less than 25 mol % based on all the monomer units M2 in the second block B; and
   the monomer unit MS is a monomer unit represented by formula III:

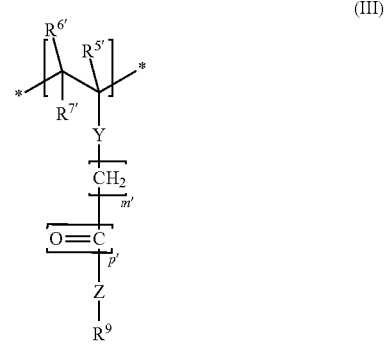

(III)

where:
      $R^{5'}$, $R^{6'}$, $R^{7'}$, m', and p' are defined identical to $R^5$, $R^6$, $R^7$, m, and p, respectively,
      Y, in each case independently of any other, is a chemical bond or —O—,
      Z, in each case independently of any other, is a chemical bond, —O—, or —NH—, and
      $R^9$, in each case independently of any other, is an unsubstituted alkyl group, a cycloalkyl group, an alkylaryl group, an aryl group, a hydroxyalkyl group, or an acetoxyalkyl group, in each case having 1-20 carbon atoms.

16. The method as claimed in claim 1, wherein in the block copolymer P:
   $R^a$ is selected from H or a methyl group.

17. The method as claimed in claim 15, wherein in the block copolymer P:
   $R^a$ is selected from H or a methyl group.

* * * * *